United States Patent [19]
Aihara et al.

[11] 3,943,306
[45] Mar. 9, 1976

[54] ELECTRIC LOADER WITH EXCESSIVE UNWIND PREVENTIVE MEANS

[75] Inventors: Toru Aihara, Sagamihara; Koichi Kimura, Zama, both of Japan

[73] Assignee: Caterpillar Mitsubishi Ltd., Tokyo, Japan

[22] Filed: Apr. 4, 1974

[21] Appl. No.: 457,900

[30] Foreign Application Priority Data
Apr. 7, 1973  Japan............................... 48-41409

[52] U.S. Cl........ 191/12.2 R; 242/86.51; 254/173 R
[51] Int. Cl.²........................................ H02G 11/00
[58] Field of Search ....... 254/166, 174, 173, 173 A; 242/86.51, 86.61, 86.8, 158 R; 180/2 R; 191/12.2 R, 12.2 A

[56] References Cited
UNITED STATES PATENTS

| | | | |
|---|---|---|---|
| 1,112,331 | 9/1914 | Sessions | 242/86.51 |
| 2,348,987 | 5/1944 | Look | 242/158 R |
| 2,589,217 | 3/1952 | Ball | 242/86.51 |
| 2,599,423 | 6/1952 | Ziegler | 242/158 R |
| 2,656,152 | 10/1953 | Moon | 242/86.51 |
| 2,781,456 | 2/1957 | Buckeridge | 242/86.51 |
| 3,061,233 | 10/1962 | Dudley | 242/86.51 |
| 3,380,545 | 4/1968 | Kemper | 254/173 R |
| 3,406,918 | 10/1968 | Ramcke | 242/158 R |

*Primary Examiner*—Robert J. Spar
*Assistant Examiner*—Kenneth Noland
*Attorney, Agent, or Firm*—Phillips, Moore, Weissenberger Lempio & Strabala

[57] ABSTRACT

An electrically driven earth-moving or construction machine provided with an electric motor as a main motor and a reel assembly to wind or unwind a cable extending to the machine from an electric source away from the machine with the advance and reverse of the machine such that required power is supplied from the stationary electric source located outside the machine to the electric motor and means of suspending power supply to the electric motor when the cable wound on the reel is unwound to a given length with the advance of the machine whereby an accident which might otherwise be caused by the careless continuance of advance of the machine with the cable completely unwound.

3 Claims, 5 Drawing Figures

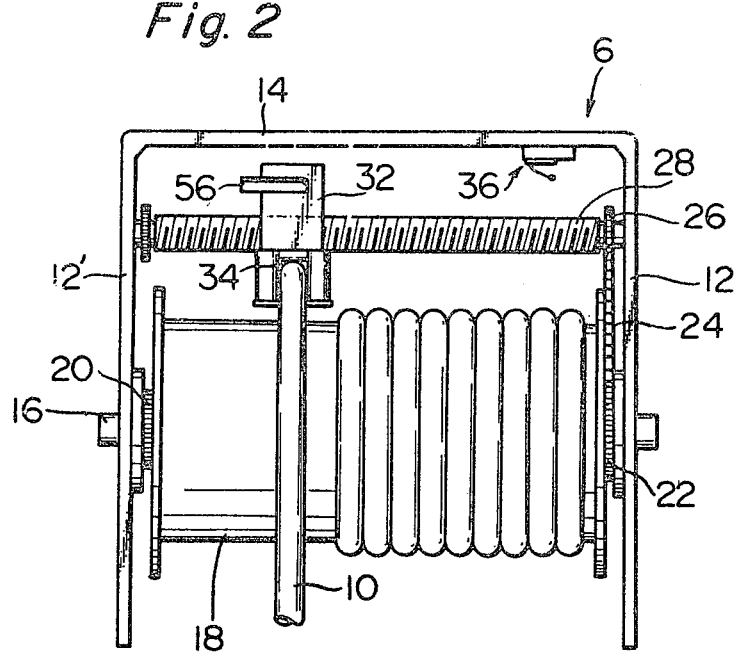
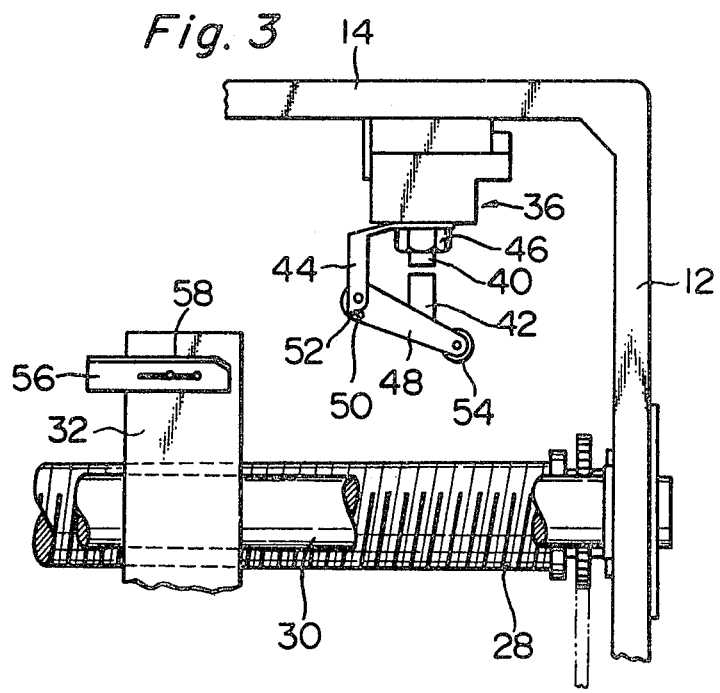

ELECTRIC LOADER WITH EXCESSIVE UNWIND PREVENTIVE MEANS

The present invention relates to an electrically driven earth-moving or construction machine provided with an electric motor as a main motor and more particularly to an electric loader with a reel assembly automatically winding or unwinding a cable for supplying electricity to the electric motor.

Recently in earth-moving or construction operations in the area governed by pollution regulations or tunnels, electrically driven vehicles have widely replaced those of internal combustion engines causing noise and exhaust gases. Those electrically driven vehicles generate no gas and are much less noisy and suitable for the aforesaid job sites. Generally, an electrically driven loader requires a cable for supplying power to a motor from a given electric source, which has hither-to caused malfunction due to cable entanglement with respect to wheels or tracks. To solve this problem has been proposed a reel assembly for automatically winding or unwinding a cable extending from the electric source to the electric loader as the electric loader advances or reverses.

An electric loader with this reel assembly attached has considerably solved problems of an power supply cable, still leaving the following defects: A cable extended from an electric source and wound on a reel needs a given length. Thus if an electric loader keeps advancing after the distance between the loader and the electric source equals nearly the length of the cable and the cable is completely unwound from the reel, intolerable tension will be given to the cable to damage or break it. For this reason, an operator must keep in mind the limitation to the advance of the loader (the limited distance from the electric source) for the operation of the loader. Generally, an operator must watch out excavating or mucking operations conducted with an implement at the front of the loader and consequently it is highly annoying for him to heed the limited advance of the loader. In some cases, beyond the limit unnoticed the cable is broken.

The object of the present invention is to provide an electric loader without the aforesaid defect.

Another object of the present invention is to provide an electric loader free from the excessive advance of the loader and the resultant cable breakage which would otherwise occur without the special care of the operation.

Still another object of the present invention is to provide a safe electric loader by automatically stopping the further advance of an electric loader when a cable wound on a reel is subjected to unwinding to a given length with the advance of the loader and preventing the loader from exceeding the limit of advance of the loader.

According to the present invention is provided an electric loader having a cable for supplying power from an electric source apart from the loader to a main electric motor in the loader which is wound or unwould or a reel assembly as the loader advances or reverses.

Further objects and advantages of the invention will become readily apparent as the following detailed description of the invention unfolds when taken in conjunction with the single FIGURE of the drawings.

FIG. 2 is a rear view of a reel assembly in an electric loader of FIG. 1.

FIG. 3 shows the details of a limit switch related to a power supply cable and a partially enlarged diagram of the reel assembly of FIG. 2.

The present invention will be described below with reference to the drawings.

Figure 1:
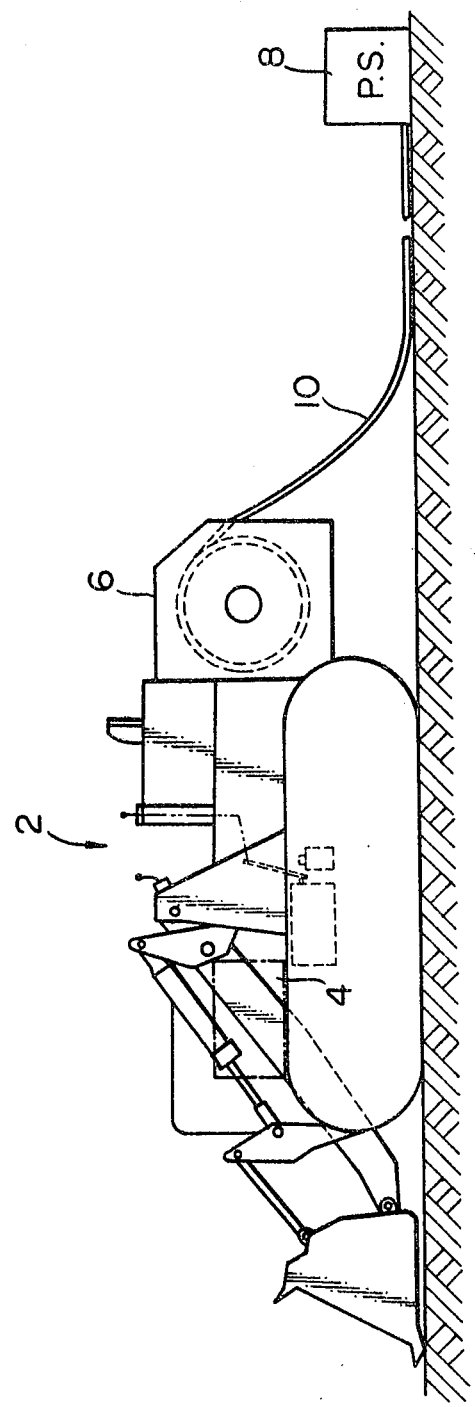
FIG. 1 is a schematic side elevation of an electric loader as a whole, of the present invention.

In FIG. 1, electric loader 2 is provided with electric motor 4 such as a three phase induction motor as a main motor. At the rear of loader 2 is disposed reel assembly 6 on which part of power supply cable 10 extending to stationary electric source 8 is wound. Cable 10 is electrically connected to electric motor 4 via optional means such as a slip ring (not shown) disposed in reel assembly 6 and supplies required power from electric source 8 to electric motor 4. Reel assembly 6 is adapted to automatically unwind or wind cable 10 as the loader advances or reverses such that cable 10 does not get entangled with trucks or wheels.

In FIG. 2, reel assembly 6 is provided with a frame having side plates 12, 12' and top plate 14. Side plates 12, 12' hold rotatably shaft 16 to which drum 18 for winding cable 10 is secured. In addition to drum 18, driven sprocket 20 is secured to the shaft near the left end and sprocket 22 near the right end. Driven sprocket 20 is connected with a chain to a sprocket secured to the output shaft of an appropriate drum-driving motor (not shown) such as a hydraulic motor to be actuated with the electric motor which is the main motor of the loader.

In contrast, sprocket 22 is connected via chain 24 to sprocket 26 secured to threaded rod 28 held rotatably with side plates 12, 12' at the upper portion of shaft 16. Cable traverse guide 32 slidably mounted on supporter shaft 30 (For simplicity it is not shown in FIG. 2. See FIG. 3) secured to side plates, 12, 12' parallel to threaded rod 28 is screwed to the aforesaid threaded rod 28. Cable 10 to be wound arround drum 18 is electrically connected to electric motor 4 via such an appropriate aid as a slip ring (not shown) one end of which is mounted on one end of drum 18 (cat the right end in FIG. 2) and which is disposed within drum 18. The portion of cable 10 unwound from drum 18 passes through opening 34 formed on traverse guide 32 and extends to stationary electric source 8 (FIG. 1) located outside an electric loader.

Any motor for driving a drum will be sufficient as long as it can control drum 18 such that it unwinds cable 10 as the loader advances and it winds it as the loader reverses, but it is preferable for the motor to give to drum 18 a given size of torque in the direction in which cable 10 is always wound on drum 18. If a given torque in the cable winding direction on drum 18 is available, cable tension caused by the advance of the cable overcomes the aforesaid torque when the loader advances to rotate drum 18 in the unwinding direction and unwind cable 10, whereas when the loader reverses the torque becomes greater than the cable tension to rotate drum 18 in the winding direction and wind cable 10. Thus with the advance and reverse 19 of the loader, cable 10 is automatically wound or unwound.

Threaded rod 28 with which cable traverse quide 32 is screwed is operably connected to drum 18 through sprocket 22, chain 24 and sprocket 26. Accordingly as drum 18 rotates, threaded rod 28 rotates to move the traverse guide 32 in the longitudinal direction of the rod.

In FIG. 2, assume that drum 18 rotates in the unwind direction of the cable. Traverse guide 32 moves to right. Conversely if drum 18 rotates in the cable wind direction, traverse guide 32 shifts to left. The guide leads winding and unwinding of cable 10 as desired. An embodiment in which sprockets and chains are used as driving and connecting means between the drum-driving motor and the drum or between the drum and the rod has been described above and in place of them, other driving and connecting means such as a belt and pulley or a gear train may be used.

Figure 5:
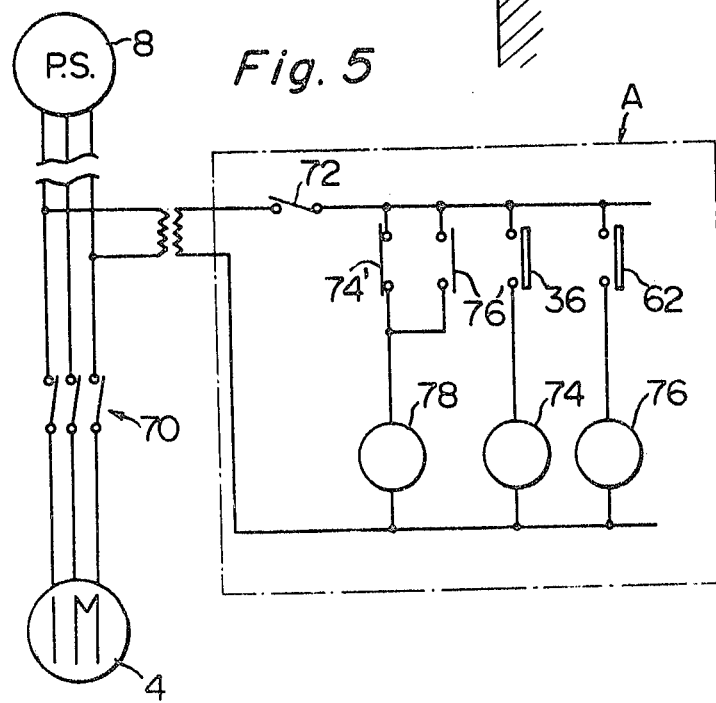
FIG. 5 is a circuit diagram used in an electric loader of the present invention.

Limit switch 36 for detecting the given unwind length of cable 10 and stopping power supply to electric motor 4 to stop the advance of the loader which will be described with reference to FIG. 5 is mounted on the under side of top plate 14 of reel assembly 6. In FIG. 3, limit switch 36 is provided with switch member 40 displaced to "open" position. It has further switch operating member 42 which is to be engaged with switch member 40 and set it in the closed position. Switch operating member 42 is secured to link 48 which is connected such that it is freely capable of turning to the lower end of inverted L-shaped member 44 secured to limit switch 36 proper via as with nut 46. Near the connecting portion of link 48 to member 44 is disposed projection 50 which is adapted to be engaged with the lower tip 52 of member 44 and define the clockwise turning limit of link 48 or the lower positioning limit of switch operating member 42. The link secured to switch operating member 42 is usually positioned by gravity or preferably with a spring (not shown) deflecting the link in the clockwise direction in the lower limit position or the position as illustrated in FIG. 3. On the free end of link 48 is mounted freely rotatable roll 54. Working piece 56 is mounted on cable traverse guide 32, which, as traverse guide 32 moves to right with the unwinding of the cable, engages roll 54 to turn the link anticlockwise and raise the switch operating member 42 and cause it to engage switch member 40 for closing the limit switch. Working piece 56 is preferably positioned on traverse guide 32 such that the position in the left and right directions in the figure is controllable and the front end or right-hand end of the upper engagement edge 58 of the working piece is preferably slightly inclined downwards as viewed in the figure such that edge 58 engages smoothly roll 54.

Figure 4:
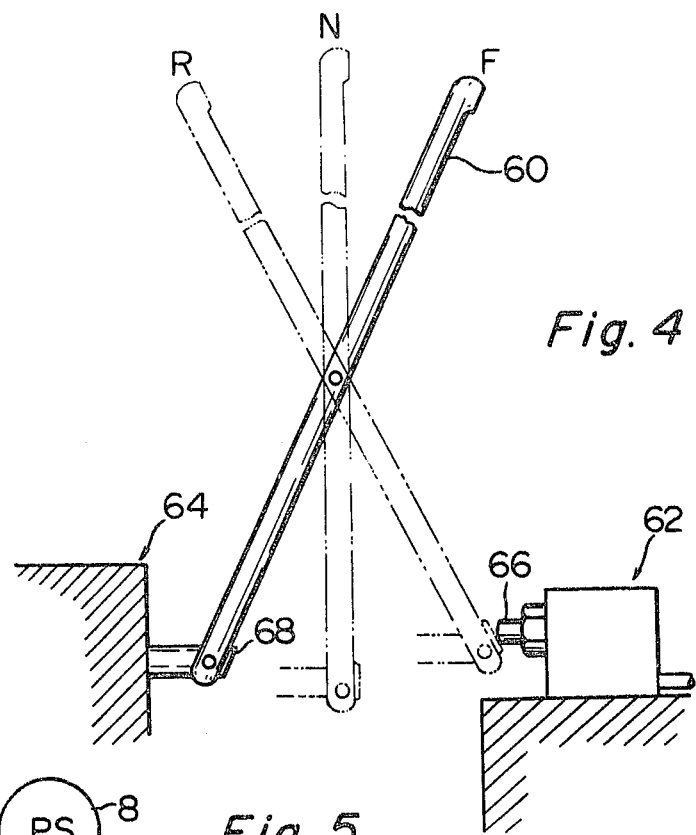
FIG. 4 is a schematic, partial diagram of a change lever for the advance and reverse of the electric loader and a related limit switch.

In FIG. 4, limit switch 62 is disposed in a predetermined position on the rear lower portion of loader shift change lever 60 connected to gear box 64 of the loader. Limit switch 62 is provided with switch 66 displaced in the position "open" usually with such an elastic means as a spring. When change lever 60 is shifted to the reverse position "R", switch 66 is pressed with switch operating piece 68 secured to the lower end of the lever 60 and placed in the position "close". Accordingly, when change lever 62 is located in advance position (F) or neutral position (N), limit switch 62 is in the position "open" and when it is in reversing position (R), the limit switch is in the position "close".

In FIG. 5, control circuit A is provided with main switch 72 to control connector 70 for handling a power supply circuit for supplying the required power to electric motor 4, which is the main motor of the electric loader from stationary electric source outside the system, and limit switches 36 and 62 are juxtaposed and connected to the control circuit. When limit switch 36 is closed, relay 74 is excited and normally closed contact 74' is changed over to "open". When limit switch 62 is closed, relay 76 is excited to change normally open contact 76' into "close". When at least either of normally closed contact 74' and normally open contact 76' is closed, relay 78 is excited and connector 70 of the power supply circuit is thus closed. When both are open, relay 78 is deenergized to open connector 70.

In earth-moving operations, when cable 10 is still sufficiently wound on cable 18, that is, working piece 56 disposed on cable traverse guide 32 leaves open limit switch 36, relay 78 is excited on the closing of main switch 72. Thus connector 70 is closed to supply desired power from electric source 8 to electric motor 4. In this case, as long as limit switch 36 is open, normally closed contact 74' is closed and consequently relay 78 is excited and connector 70 is closed whether normally open contact 76' related to the position of change lever 60 is open or closed. Then as change lever 60 is placed in forward position (F) (naturally normally open contact 76 is left open.) and a loader advances, cable 10 wound on drum 18 is gradually unwound, and accordingly traverse guide 32 shifts to right in FIGS. 2 and 3. If a loader further proceeds and almost all the cables 10 are unwound, traverse guide 32 shifts further to the right, working piece 56 on the guide is engaged with roller 54 and limit switch 36 is closed. If the limit switch is closed, relay 74 will be excited and normally closed contact 74' will be opened. In this case, change lever 60 is in the advance position and limit switch 62 is open and consequently normally open contact 76' is open. When normally closed contact 74' is open, relay 78 is deenergized to open connector 70. When the electric loader continues advancing and almost all cable 10 is unwound, that is, when the loader approaches the advance limit, power supply to electric motor 4 is suspended and the further advance of the loader beyond the limit is prevented.

As described above, when power supply to electric motor 4 is suspended and change lever 60 is changed into the reverse position, limit switch 62 will be closed, relay 76 will be energized and normally open contact 76' will be closed. Hence, relay 78 is excited, connector 70 is again closed and power supply to electric motor 4 is resumed.

According to the present invention, as soon as the loader comes to the advance limit, further advance is prevented and only the reverse of the loader becomes possible. When the loader reverses in predetermined amounts, cable 10 is wound on drum 18 and cable traverse guide 32 shifts to the left in FIGS. 2 and 3 to disengage working piece 56 from roll 54. By this, limit switch 36 is again open and normally closed contact 74' is closed. When cable 10 returns to the state in which it is wound to some extent, relay 78 is excited regardless of the position of change lever 60. The loader is placed in condition for both advance and reverse with the operation of lever 60.

Time to close limit switch 36 is controllable by adjusting the position of working piece 56 mounted on cable traverse guide 32. Generally, in consideration of the inertial movement of the loader after the suspension of rotation of electric motor 4, it is preferable to adjust the position of working piece 56 by closing limit switch 36 just before cable 10 is completely unwound, that is when the length of the wound cable is 3 meters or above.

Such is the detailed description of steps of preventing excessive advance of a loader stemming from the excessive unwind of a cable, but it is evident that it is possible to stop the excessive reverse of the loader when almost all the cable has been wound in the course of reverse. For instance, if there is a fear of troubles of the cable occuring by the excessive reverse of a loader after the almost complete winding of the cable, it is possible to suspend power supply to the electric motor when the cable has almost been wound by the same procedure as that of limiting the advance of the loader (For instance, a limit switch closed as a traverse guide on reel assembly 6 shifts to the left in FIG. 2.). Further when the loader comes to the limit of advance or reverse, power supply to an electric motor is suspended and the operator is cautioned by actuating alarm means such as an alarm buzzer that the loader is approaching the advance limit or the reverse limit.

It will be obvious to those skilled in the art that various changes may be made without departing from the scope of the invention and the invention, is not be considered limited to what is shown in the aforesaid embodiment.

What we claim is:

1. In an electrically powered vehicle having a directional control lever with a forward and reverse position to select the direction of travel, and further having a reel assembly carrying a power cable, the power cable providing electrical energy to the vehicle from a remote power source to power the electric drive motor of the vehicle, the reel assembly being operable to wind and unwind the power cable while the vehicle is moving, and having sense means for determining when a predetermined length of cable has been unwound; a power connection system comprising:

first switch means connected between the power source and said electric drive motor and operably connected to the sense means for automatically interrupting power to said electric drive motor in response to the sensing by the sense means when said predetermined length of cable has been unwound; and second switch means connected between said power source and said electric drive motor and operably connected to the directional control lever for restoring power to the electric drive motor when the directional control lever is moved to its reverse position, said second switch means only being operable after said first switch means has interrupted the power to said drive motor to restore power thereto.

2. In an electrically powered vehicle having a directional control lever with a forward and reverse position to select the direction of travel, and further having a reel assembly carrying a power cable, the power cable providing electrical energy to the electric motor driving the vehicle from a remote power source, the reel assembly operable to wind and unwind the power cable while the vehicle is moving, and having sense means for determining when a predetermined length of cable has been unwound; a power connection system comprising:

a main power connector switch means connected between the power source and the electric motor operable to control the power delivered from the remote power source to said electric motor; and control means for opening and closing the main power connector switch means, having a first switch actuator means connected to the sense means operable to open said main power connector switch means when the sense means has determined a predetermined length of cable has been unwound and having a second switch actuator means connected to the directional control lever operable to close said main power connector switch means while the directional control lever is in the reverse position, said second switch actuator means only being operable after said first switch actuator means has interrupted the power to said electric motor to restore power thereto.

3. The power connection system set forth in claim 2 wherein the control means further includes a main switch means for positioning the first switch actuator means in a normally closed position and allowing the first switch actuator means to be responsive to the sense means.

* * * * *